US005575844A

United States Patent [19]

Bradshaw

[11] Patent Number: 5,575,844

[45] Date of Patent: Nov. 19, 1996

[54] METHOD OF PREPARING GYPSUM PRODUCTS

[75] Inventor: John J. Bradshaw, Derby, United Kingdom

[73] Assignee: BPB Industries Public Limited Company, Slough, United Kingdom

[21] Appl. No.: 467,805

[22] Filed: Jun. 6, 1995

Related U.S. Application Data

[62] Division of Ser. No. 203,404, Mar. 1, 1994, Pat. No. 5,484,200.

[30] Foreign Application Priority Data

Mar. 1, 1993 [GB] United Kingdom .................. 9304120

[51] Int. Cl.[6] .................................................. C04B 38/00

[52] U.S. Cl. ......................... 106/680; 106/674; 106/772; 106/778; 106/779; 106/783; 106/785

[58] Field of Search .................................. 106/680, 772, 106/778, 779, 783, 674, 785

[56] References Cited

U.S. PATENT DOCUMENTS

| | | | |
|---|---|---|---|
| 1,660,243 | 2/1928 | Thomson | 366/13 |
| 4,156,615 | 5/1979 | Cukier | 106/680 |
| 4,523,954 | 6/1985 | Pichat et al. | 106/680 |
| 5,158,612 | 10/1992 | Savoly et al. | 106/680 |
| 5,173,364 | 12/1992 | Geeraert | 106/680 |
| 5,240,639 | 8/1993 | Diez et al. | 106/680 |

FOREIGN PATENT DOCUMENTS

| | | | |
|---|---|---|---|
| 889539 | 11/1981 | Belgium . | |
| 1033702 | 4/1953 | France . | |
| 1232862 | 1/1967 | Germany . | |
| 1278917 | 9/1968 | Germany . | |
| 1510165 | 7/1975 | Germany . | |
| 2837459 | 8/1978 | Germany . | |
| 58-088153 | 5/1983 | Japan | 106/680 |
| 175632 | 1/1987 | Japan . | |
| 5286781 | 11/1993 | Japan . | |
| 134547 | 10/1929 | Switzerland . | |
| 1596200 | 5/1978 | Switzerland . | |
| 765233 | 9/1980 | U.S.S.R. | 106/680 |
| 2086748 | 10/1981 | United Kingdom . | |
| 2218650 | 11/1989 | United Kingdom . | |

*Primary Examiner*—Anthony Green

[57] ABSTRACT

The invention provides a method of making gypsum products such as plasterboard from foamed gypsum plaster slurry. The method uses a first mixing chamber 10 containing a high speed rotor 14 and inlets 18, 19 for gypsum plaster and water. The initial dispersion of gypsum plaster and water foamed in the first chamber passes directly and continuously into a second chamber 25 containing a low speed rotor 29. Preformed foam is introduced into the second chamber through an inlet 33, and the foamed slurry product leaves the second chamber through an outlet 34, to be formed into plasterboard.

12 Claims, 1 Drawing Sheet

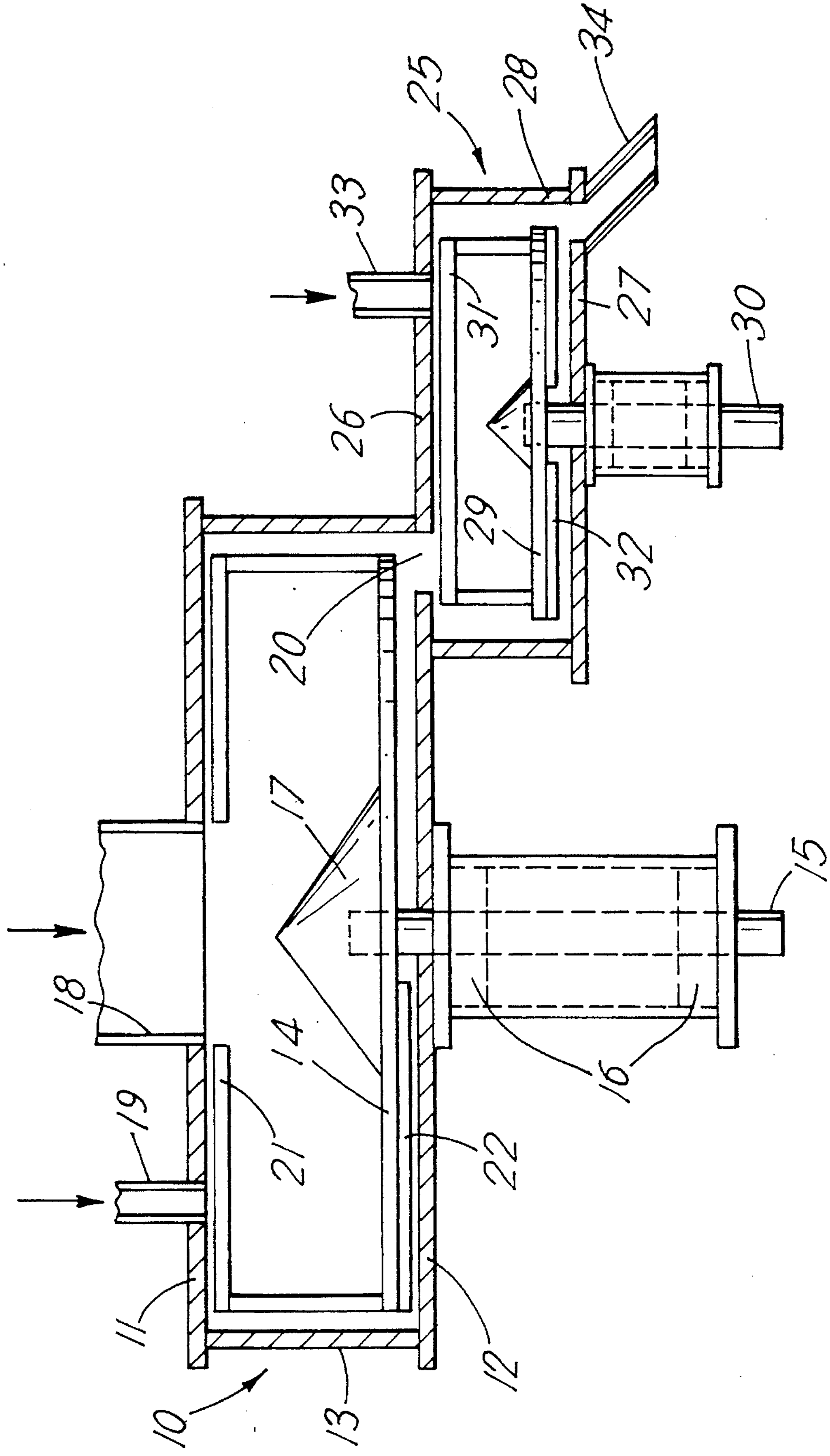
10
11
12
13
14
15
16
17
18
19
20
21
22
25
26
27
28
29
30
31
32
33
34

METHOD OF PREPARING GYPSUM PRODUCTS

This application is a divisional of application Ser. No. 08/203,404, filed on Mar. 1, 1994, now U.S. Pat. No. 5,484,200, the entire contents of which are hereby incorporated by reference.

The present invention relates to a mixer for preparing aerated slurries of gypsum plaster (calcium sulphate hemihydrate) in a liquid, for use in the preparation of gypsum products, most notably plasterboard, gypsum panels and the like.

It has been common practice for many years to employ horizontal rotary mixers for the preparation of aerated slurries in the production of plasterboard and other gypsum products of relatively low density. Such mixers comprise a relatively wide and shallow cylindrical housing, which accommodates a generally circular horizontal rotor and is provided with inlets for gypsum plaster, water and a preformed aqueous foam, together with other possible additives. Examples of such mixers are shown in U.S. Pat. Nos. 2,639,901 and 3,343,818, in both of which intermeshing pins are provided respectively on the rotor and the top wall of the housing.

In the preparation of slurries for the manufacture of plasterboard and similar products it is desirable that the gypsum plaster should be highly dispersed in the aqueous medium since this helps in developing strength in the set gypsum. It is also preferred that the air entrained in the slurry should be evenly dispersed in the form of small bubbles. Mixers currently in use give satisfactory gypsum plaster dispersion but tend to give uneven distribution of air, leading to the presence of significant voids in the set gypsum and to a relatively low level of incorporation of air in the slurry.

SUMMARY OF THE INVENTION

The present invention now provides a method of preparing gypsum products Which comprises:

(i) preparing a foamed slurry of a gypsum plaster comprising:

(a) dispersing gypsum plaster in a liquid medium under conditions of relatively high shear to produce an initial dispersion;

(b) blending the initial dispersion with a foam under conditions of relatively low shear; and (ii) forming the foamed slurry into a gypsum product.

Preferably the foam is formed prior to blending with the initial dispersion. Preferred foams are formed by incorporating air into a liquid medium.

Additives or other ingredients of the final slurry may be added at any stage, but preferably in step (b), in which the foam is mixed with the initial dispersion of the gypsum plaster.

The invention also provides apparatus for the preparation of a foamed slurry of gypsum plaster for use in the preparation of gypsum products which comprises: at least one rotary mixer element operative in a first mixing zone and adapted to develop relatively high shear to produce an initial dispersion of the gypsum plaster, the first zone having inlets for the gypsum plaster and a liquid medium; and at least one rotary mixer element operative in a second mixing zone of relatively low shear in direct communication with the first mixing zone, the second mixing zone being provided with an inlet for a foam component and an outlet for the foamed slurry of gypsum plaster.

If a preformed foam is employed, the inlet to the second zone is an inlet for the preformed foam. Inlets may additionally be provided for additives or other ingredients, usually solid, of the final slurry, and these are preferably provided in the portion of the apparatus providing the second mixing zone.

A preferred embodiment of this invention comprises: a first mixing chamber containing a first mixing rotor adapted to be driven at a relatively high speed and having inlets for the gypsum plaster and for a liquid (such as water) and an outlet for the resulting initial dispersion; a second mixing chamber containing a second mixing rotor adapted to be driven at a lower speed than the first mixing rotor and having inlets for the initial dispersion of the gypsum plaster and for a foam component (preferably preformed foam) and an outlet for foamed slurry, the outlet of the first mixing chamber being disposed to deliver the initial dispersion slurry directly into the corresponding inlet of the second mixing chamber.

Advantageously, the first zone or chamber is larger than the second. Preferably, the ratio of the volume of the first zone or chamber to that of the second is within the range of about 1:1 to 5:1, preferably about 2:1 to 4:1, more preferably about 2.5:1 to 3.5:1. In a particularly useful mixer, the volume of the first chamber is about 1701 and that of the second chamber about 501, the volume ratio of the first chamber to the second being about 3.4:1.

The relatively high shear in the first mixing zone or chamber is preferably developed by rotating the mixing rotor in the first mixing zone at a peripheral speed of 10–50 m/s. Where the second mixing rotor is provided in the second mixing zone it is preferably rotated at a peripheral speed in the range of 0.1 to 10 m/s. Preferably the shear rate on the first zone is at least 5 times as great as in the second zone and may be 30 times or more as great. It is preferred that the inlets for the gypsum plaster and the liquid in the first mixing zone should be at smaller radial distances from the rotational axis of the mixing rotor than the outlet for the initial dispersion. Similarly it is preferred that the inlets for the initial dispersion and the foam in the second mixing zone should be radially less distant from the axis of rotation of the mixing rotor than the outlet for the aerated slurry. In both cases, this means that the input is in a relatively low energy region of the mixer and the output from a relatively high energy region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in greater detail by way of example, with reference to the accompanying drawing which is given by way of illustration only, and thus is not limitative of the present invention, which shows in diagrammatic vertical section a two-stage mixer in accordance with this invention.

DETAILED DESCRIPTION OF PREFERRED EMBODIMENTS

As shown in the drawing, a first mixing chamber 10 is formed from a top wall plate 11, a bottom wall plate 12 and a cylindrical side wall 13. For cleanliness of operation these are preferably made of stainless steel although other materials may be used. A disc shaped mixing rotor 14, preferably also of stainless steel, is mounted on a rotatable shaft 15 which is supported by bearings 16 and passes in liquid-tight manner through the bottom wall 12. The top of the shaft and the central area of the rotor are covered by a conical deflector 17.

An inlet 18 for gypsum plaster is provided in the top wall 11, preferably in a central or axial position. A further inlet 19 for water is also provided in the top wall, approximately midway between the gypsum plaster inlet and the outer periphery of the mixing chamber. An outlet 20 for the initial dispersion formed in the first mixing chamber is provided in the bottom wall 12 preferably in the outermost region thereof and in the vicinity of the side wall 13.

Top scrapers 21 are mounted radially on the top of each rotor, being supported at the outer edge of the rotor and extending inwards to the edge of the gypsum plaster inlet 18. Bottom scrapers 22 are mounted radially on the under surface of the rotor 14. The scrapers are adjusted to give minimal clearance with the respective walls.

The surface of the rotor can be provided with pegs or teeth, for example round the periphery, but this has not been found necessary in the case of preparing slurries of gypsum plaster.

The apparatus shown in the drawings includes a second mixing chamber 25 which similarly comprises top 26 and bottom 27 walls and a cylindrical side wall 28. The top wall 26 may be formed from the same plate as the bottom wall 12 of the first mixing chamber 10.

A second mixing rotor 29 is mounted on a shaft 30 in similar manner to the rotor in the first mixing chamber and may likewise be provided with top and bottom scrapers 31, 32. The top scraper 31 may conveniently extend continuously across the top of the chamber because there is no central inlet for gypsum plaster in the second chamber 25. The rotor has a similar clearance with the side wall 28 and the scrapers similar clearances with the top 26 and bottom 27 walls respectively, as in the first mixing chamber.

The outlet 20 from the first chamber constitutes the inlet to the second chamber for the initial dispersion, and the top wall 26 is also formed with an inlet 33 for previously formed aqueous foam. An outlet 34 for the aerated slurry is provided in the outer region of the bottom wall 27 in close proximity to the side wall 28.

In operation, plaster or gypsum plaster is supplied continuously through the inlet 18 and water through the inlet 19. These meet on the upper surface of the rotor element 14, where they are mixed and passed between the rotor and the side wall 13. The resulting initial dispersion passes through the outlet 20 into the second chamber 25, falling on the upper surface of the rotor 29, where it meets preformed foam entering through the inlet 33. The initial dispersion and the foam are mixed together under lower shear conditions than those prevailing in the first mixing chamber, whereby uniform distribution of the incorporated air is achieved with minimal separation of air into significant voids. The resulting aerated slurry is delivered through the outlet 34.

When, as is commonly the case, additives and other ingredients are employed, for example, lightweight aggregate, reinforcing fibre, setting accelerator and starch, these may be added at either stage through specially provided inlets.

Surprisingly, it has been found advantageous to have the second mixing chamber 25 of smaller capacity than the first mixing chamber 10, despite the increased volume (due to the addition of foam) of the contents of the second chamber compared to those of the first chamber. The residence time in the second stage is thus kept very short, so that the total residence time in the complete mixer will be comparable with that in a single stage mixer of the prior art.

Board produced from aerated plaster slurries prepared in accordance with this invention has shown significant advantages over current production. A distribution of air is observed which provides a beneficial distribution of voids. Surprisingly, such slurries provide set products of improved strength. Thus, with boards of similar density a significant increase in compressive strength is observed. Conversely, boards of a required strength can be obtained with significantly lower density. The following table illustrates this, by comparing the compressive strength of set plaster samples of two different slurry densities made by (A) a method and apparatus of the invention and (B) by conventional method and apparatus using a single stage mixer. The gypsum plaster and foam compositions are the same in each example.

| SLURRY DENSITY ($kg/m^3$) | COMPRESSIVE STRENGTH ($N/mm^2$) | |
|---|---|---|
| | A | B |
| 700 | 2.6 | 1.5 |
| 800 | 4.4 | 3.6 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of preparing gypsum products comprising the steps of:

(i) preparing a foamed slurry of a gypsum plaster comprising:

(a) dispersing gypsum plaster in a liquid medium under conditions of shear to produce an initial dispersion;

(b) blending the initial dispersion with a foam under conditions of lower shear than conditions under which step (i)(a) occurs; and (ii) forming the foamed slurry into a gypsum product.

2. The method according to claim 1, wherein step (i)(a) is performed in a first mixing chamber and step (i)(b) is performed in a second mixing chamber, and wherein the initial dispersion produced by step (i)(a) is directly and continuously transferred from the first mixing chamber to the second mixing chamber.

3. The method according to claim 1, wherein the shear in step (i)(a) is 5–30 times higher than the shear in step (i)(b).

4. The method according to claim 1, further including the step of adding a lightweight aggregate in step (i)(b).

5. The method according to claim 1, further including the step of adding a reinforced fiber in step (i)(b).

6. The method according to claim 1, further including the step of adding a setting accelerator in step (i)(b).

7. The method according to claim 1, further including the step of adding a starch in step (i)(b).

8. The method according to claim 1, wherein the foam is formed by incorporating air into a liquid medium.

9. The method according to claim 1, further including the step of adding a lightweight aggregate in step (i)(a).

10. The method according to claim 1, further including the step of adding a reinforced fiber in step (i)(a).

11. The method according to claim 1, further including the step of adding a setting accelerator in step (i)(a).

12. The method according to claim 1, further including the step of adding a starch in step (i)(a).

* * * * *